(12) United States Patent
Wood et al.

(10) Patent No.: US 11,554,896 B2
(45) Date of Patent: Jan. 17, 2023

(54) HYBRID PALLET

(71) Applicant: CHEP Technology Pty Limited, Sydney (AU)

(72) Inventors: Matthew Wood, Davenport, FL (US); Paul M. Melia, Saint Petersburg, FL (US); Daniel J Lantz, Orlando, FL (US)

(73) Assignee: CHEP Technology Pty Limited, Sydney (AU)

( * ) Notice: Subject to any disclaimer, the term of this patent is extended or adjusted under 35 U.S.C. 154(b) by 0 days.

(21) Appl. No.: 16/805,973

(22) Filed: Mar. 2, 2020

(65) Prior Publication Data
US 2020/0283192 A1 Sep. 10, 2020

Related U.S. Application Data

(60) Provisional application No. 62/814,358, filed on Mar. 6, 2019.

(51) Int. Cl.
*B65D 19/00* (2006.01)

(52) U.S. Cl.
CPC ............ *B65D 19/0051* (2013.01); *B65D 2519/00034* (2013.01); *B65D 2519/00064* (2013.01); *B65D 2519/00288* (2013.01); *B65D 2519/00323* (2013.01); *B65D 2519/00552* (2013.01)

(58) Field of Classification Search
CPC ...... B65D 19/0051; B65D 2519/00034; B65D 2519/00064; B65D 2519/00288; B65D 2519/00323; B65D 2519/00552

USPC .................................................. 108/57.25
See application file for complete search history.

(56) References Cited

U.S. PATENT DOCUMENTS

| | | | | |
|---|---|---|---|---|
| 3,204,583 | A * | 9/1965 | Nicholson | B65D 19/0091 108/51.11 |
| 4,240,358 | A * | 12/1980 | Munroe | B65D 19/0069 108/57.1 |
| 5,057,350 | A * | 10/1991 | Gezels | B65D 19/0026 428/36.5 |
| 5,351,628 | A * | 10/1994 | Breezer | B65D 19/0022 108/56.1 |
| 5,636,577 | A | 6/1997 | Gow | |
| 5,960,721 | A * | 10/1999 | Huetteman | B65D 19/0095 108/57.17 |
| 6,576,331 | B1 | 6/2003 | Ryan | |
| 6,705,237 | B2 * | 3/2004 | Moore, Jr. | B65D 19/0012 108/57.25 |
| 8,261,673 | B2 * | 9/2012 | Ingham | B65D 19/0095 108/51.11 |

(Continued)

FOREIGN PATENT DOCUMENTS

| | | |
|---|---|---|
| CN | 2120086 | 10/1992 |
| CN | 2120086 U | 10/1992 |

(Continued)

*Primary Examiner* — Daniel J Troy
*Assistant Examiner* — Timothy M Ayres
(74) *Attorney, Agent, or Firm* — Allen, Dyer, Doppelt+ Gilchrist, PA (57) ABSTRACT

A pallet includes a plastic top deck and a bamboo bottom deck. The bamboo bottom deck includes bamboo boards made from bamboo strips layered together. Support blocks are coupled between the bamboo bottom deck and the plastic top deck, with a gap being formed therebetween for receiving a lifting member.

20 Claims, 7 Drawing Sheets

(56) References Cited

U.S. PATENT DOCUMENTS

| | | | |
|---|---|---|---|
| 8,438,981 B2 | 5/2013 | Linares | |
| 8,627,773 B2 * | 1/2014 | Storteboom | B65D 19/38 |
| | | | 108/51.11 |
| 8,701,569 B2 | 4/2014 | Linares | |
| 8,813,660 B2 | 8/2014 | Linares | |
| 9,334,083 B2 | 5/2016 | Joung | |
| 9,776,762 B2 * | 10/2017 | De Beer | B65D 19/38 |
| 10,053,261 B2 * | 8/2018 | Storteboom | B65D 19/0073 |
| 10,081,453 B2 * | 9/2018 | Storteboom | B65D 19/0012 |
| 10,081,454 B2 * | 9/2018 | Storteboom | B65D 19/0016 |
| 10,364,063 B2 * | 7/2019 | Storteboom | B65D 19/0071 |
| 2002/0033122 A1 | 3/2002 | Lin | |
| 2003/0049428 A1 | 3/2003 | Ryan | |
| 2004/0112261 A1 | 6/2004 | Moore, Jr. et al. | |
| 2005/0056193 A1 | 3/2005 | Laender et al. | |
| 2005/0145145 A1 * | 7/2005 | Ogburn | B65D 19/0012 |
| | | | 108/57.25 |
| 2008/0196633 A1 | 8/2008 | Ho | |
| 2010/0062233 A1 | 3/2010 | Cohen et al. | |
| 2010/0229764 A1 | 9/2010 | Ingham | |
| 2011/0005435 A1 | 1/2011 | Renck et al. | |
| 2012/0260832 A1 | 10/2012 | Linares | |
| 2015/0274357 A1 | 10/2015 | Linares | |
| 2015/0360809 A1 | 12/2015 | McBride et al. | |
| 2016/0311572 A1 * | 10/2016 | Wilhelm | B65D 19/0026 |
| 2017/0190463 A1 | 7/2017 | De Beer et al. | |
| 2017/0355488 A1 | 12/2017 | De Beer et al. | |
| 2018/0141704 A1 * | 5/2018 | Storteboom | B65D 19/0071 |
| 2018/0141707 A1 * | 5/2018 | Storteboom | B65D 19/38 |
| 2018/0141708 A1 | 5/2018 | Storteboom | |
| 2018/0215505 A1 | 8/2018 | Hawley et al. | |
| 2018/0282017 A1 * | 10/2018 | Bastian, II | B65D 19/0069 |
| 2019/0118429 A1 * | 4/2019 | Linares | B29C 33/12 |

FOREIGN PATENT DOCUMENTS

| | | | |
|---|---|---|---|
| CN | 1079707 | | 12/1993 |
| CN | 2223261 | | 3/1996 |
| CN | 2584531 | Y | 11/2003 |
| CN | 2853651 | Y | 1/2007 |
| CN | 200940011 | Y | 8/2007 |
| CN | 200945733 | | 9/2007 |
| CN | 101254835 | B | 9/2008 |
| CN | 101402405 | | 4/2009 |
| CN | 201284042 | | 8/2009 |
| CN | 201381001 | Y | 1/2010 |
| CN | 201484764 | | 5/2010 |
| CN | 202572545 | U | 12/2012 |
| CN | 202702387 | U | 1/2013 |
| CN | 202846658 | U | 4/2013 |
| CN | 103213359 | A | 7/2013 |
| CN | 103587780 | | 2/2014 |
| CN | 103863653 | | 6/2014 |
| CN | 103863653 | A | 6/2014 |
| CN | 203714360 | U | 7/2014 |
| CN | 203806300 | | 9/2014 |
| CN | 203921481 | | 11/2014 |
| CN | 105235038 | B | 1/2016 |
| CN | 105397884 | B | 3/2016 |
| CN | 106458365 | | 2/2017 |
| CN | 108883856 | | 11/2018 |
| EP | 3689773 | A1 * | 8/2020 |
| GB | 789603 | | 1/1958 |
| IT | 20111079 | | 5/2013 |
| JP | S5451769 | U | 4/1979 |
| JP | H0565838 | U | 8/1993 |
| JP | H07223636 | A | 8/1995 |
| JP | 3026595 | U | 7/1996 |
| JP | 2003039407 | | 2/2003 |
| JP | 2009132452 | | 6/2009 |
| JP | 2009132452 | A | 6/2009 |
| JP | 2009137609 | A | 6/2009 |
| JP | 3168422 | | 6/2011 |
| KR | 20110089037 | A | 8/2011 |
| TW | 435428 | | 5/2001 |
| WO | WO2007019833 | | 2/2007 |
| WO | WO2014/069864 | | 4/2014 |

* cited by examiner

HYBRID PALLET

RELATED APPLICATION

This application claims the benefit of provisional application Ser. No. 62/814,358 filed Mar. 6, 2019, which is hereby incorporated herein in its entirety by reference.

TECHNICAL FIELD

The present disclosure relates to the field of pallets, and more particularly, to a hybrid pallet.

BACKGROUND

Pallets are customarily used to transport and store goods. A pallet typically includes a top deck and a bottom deck separated by support blocks. Pallets are used to serve several purposes which include the loading of equipment, and the stacking of items for transportation and storage. A pallet needs to maintain durability to serve the particular purpose for which it is being used.

SUMMARY

A pallet includes a plastic top deck, and a bamboo bottom deck. The bamboo bottom deck includes a plurality of bamboo boards. A plurality of support blocks is coupled between the bamboo bottom deck and the plastic top deck, with a gap being formed therebetween for receiving a lifting member.

Each bamboo board may include a plurality of bamboo strips layered together. Each bamboo board may further include a plastic composite added to the plurality of bamboo strips. A direction of each bamboo strip may be orthogonal to a direction of an adjacent bamboo strip.

In other embodiments, each bamboo board may include a top section, a bottom section, and at least one middle section between the top and bottom sections. The top section may include a plurality of bamboo strips layered together, with the plurality of bamboo strips extending in a first direction. Similarly, the bottom section may include a plurality of bamboo strips layered together, with the plurality of bamboo strips extending in the first direction. The at least one middle section may include a plurality of bamboo strips layered together, with the plurality of bamboo strips extending in a second direction that is different from the first direction. The second direction may be orthogonal or crisscrossed with respect to the first direction.

The bamboo bottom deck may include a pair of bamboo end deck boards, a pair of bamboo connector boards extending between the pair of bamboo end deck boards, and an intermediate bamboo connector board extending between the pair of bamboo end deck boards. The intermediate bamboo connector board and the bamboo connector boards may be orthogonal to the bamboo end deck boards. Respective joints between the pair of bamboo end deck boards and the pair of bamboo connector boards may be mitered.

At least one of the support blocks may include an upper surface, a lower surface, and first and second pairs of opposing sides extending between the upper and lower surfaces. One of the sides may have a pocket formed therein for receiving an end of the lifting member so as to allow the pallet to be spun around. At least one clinched nail may extend through one of the bamboo boards and into the pocket in the at least one support block.

At least one of the support blocks may include an upper surface and a lower surface. A first pair of opposing sides extend between the upper and lower surfaces and may have a first opening extending therethrough. A second pair of opposing sides extend between the upper and lower surfaces and may have a second opening extending therethrough, and intersecting with the first opening. At least one clinched nail may extend through one of the bamboo boards and into the first or second opening in the at least one support block.

Each support block may be wood, plastic, wood and plastic composite, or metal. The plastic top deck may be configured as a monolithic plastic top deck. The monolithic plastic top deck may include a plurality of metal strips inserted therein for support, with each metal strip including perforated holes extending therethrough. The perforated holes may extend in a direction that is orthogonal to an upper surface of the plastic top deck.

Another aspect is directed to a method for making a pallet as described above. The method includes forming a plastic top deck, forming a bamboo bottom deck that includes a plurality of bamboo boards, and forming a plurality of support blocks. The method further includes coupling the plurality of support blocks between the bamboo bottom deck and the plastic top deck, with a gap being formed therebetween for receiving a lifting member.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

Figure 1:
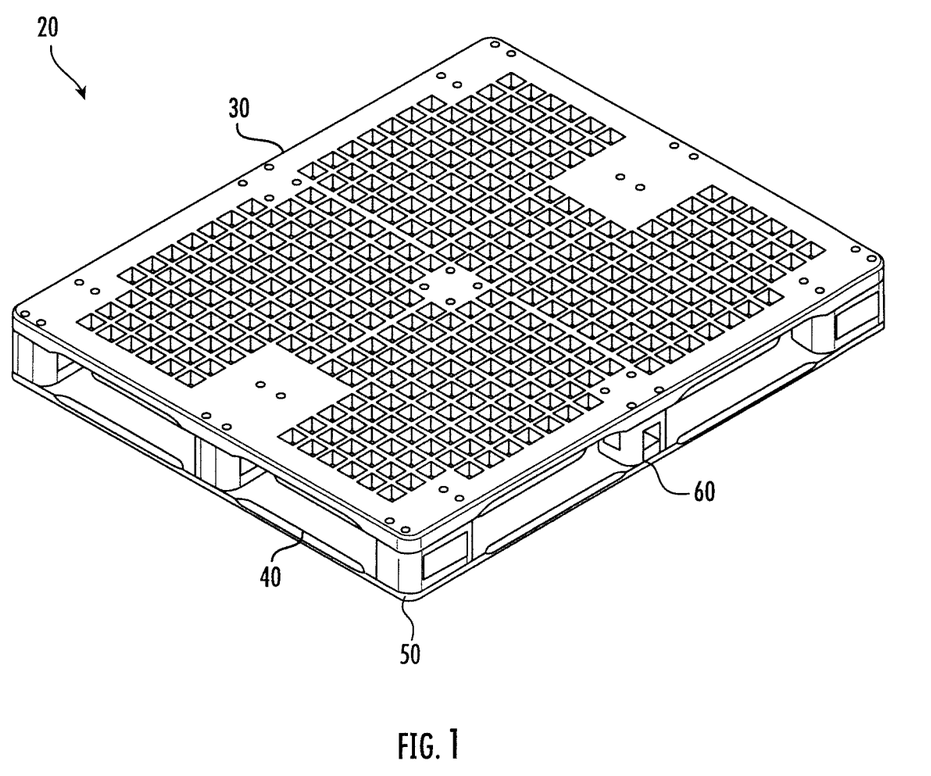
FIG. 1 is an upper perspective view of a hybrid pallet in accordance with the disclosure.
Figure 2:
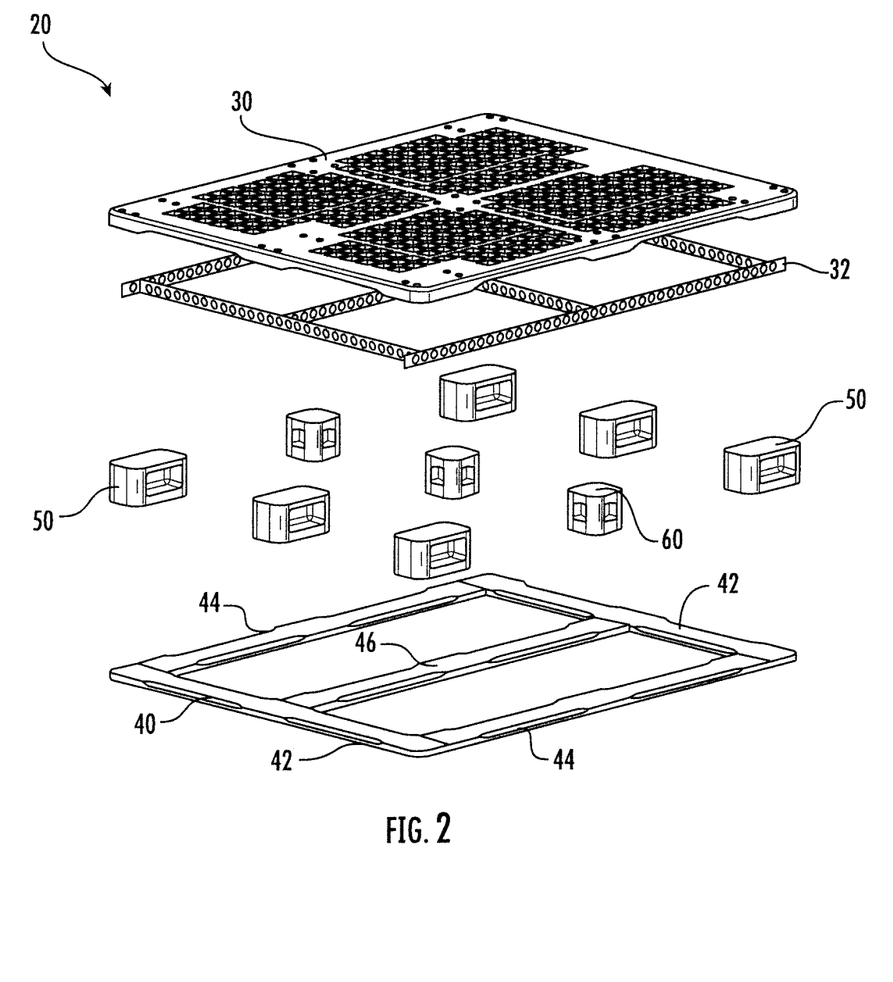
FIG. 2 is a side view of the hybrid pallet shown in FIG. 1.
Figure 3:
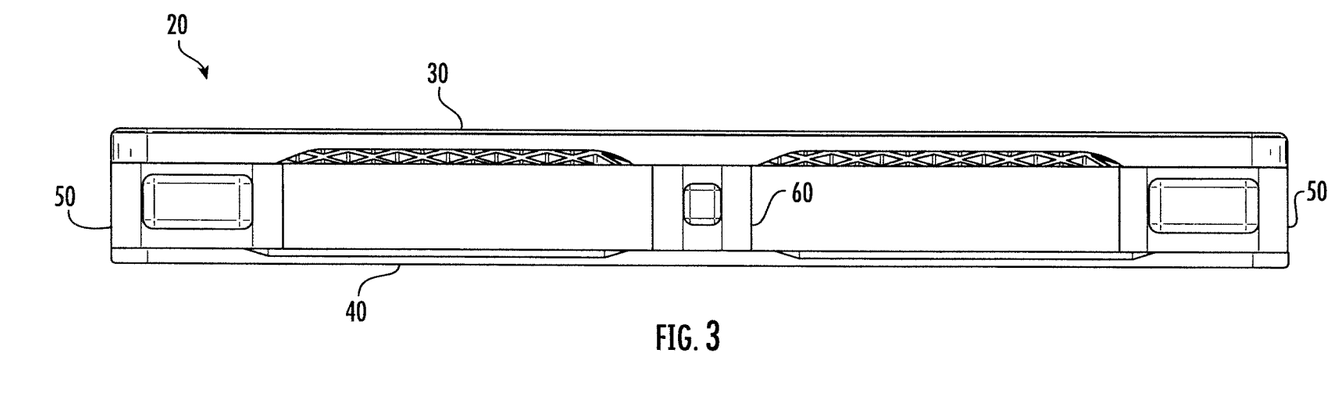
FIG. 3 is an end view of the hybrid pallet shown in FIG. 1.

Referring initially to FIGS. 1-3, a hybrid pallet 20 includes a top deck 30 formed out of plastic, a bottom deck 40 formed out of bamboo, and a plurality of spaced apart support blocks 50, 60 positioned therebetween. The support blocks 50, 60 may be formed out of wood, plastic, wood/plastic composite, or metal.

The support blocks 50, 60 form a gap between the top and bottom decks 30, 40 for receiving a lifting member. The lifting member may be the metal tines of a forklift or pallet jack. The top deck 30 is also known as the cargo layer, and the bottom deck 40 is also known as the base layer.

An exploded view of the hybrid pallet 20 is provided in FIG. 2. The top deck 30 is formed as one piece and includes metal bars or strips 32 inserted therein for support. The one piece top deck 30 may also be referred to as a monolithic top deck.

Figure 5:
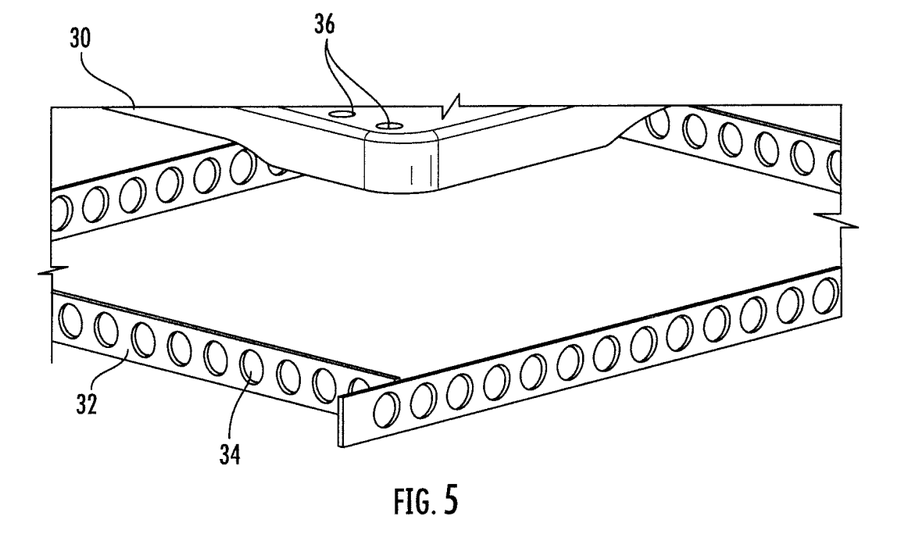
FIG. 5 is an exploded partial view of the top deck shown in FIG. 1.

The metal strips 32 are perforated with holes 34. The top deck 30 also includes perforated holes 36. The holes 34, 36 do not compromise durability of the top deck 30. If the metal strips were not added for support, then the top deck would need to be thicker to provide the needed support. The perforated holes 34 extend in a direction that is orthogonal to an upper surface of the top deck 30.

Figure 4:
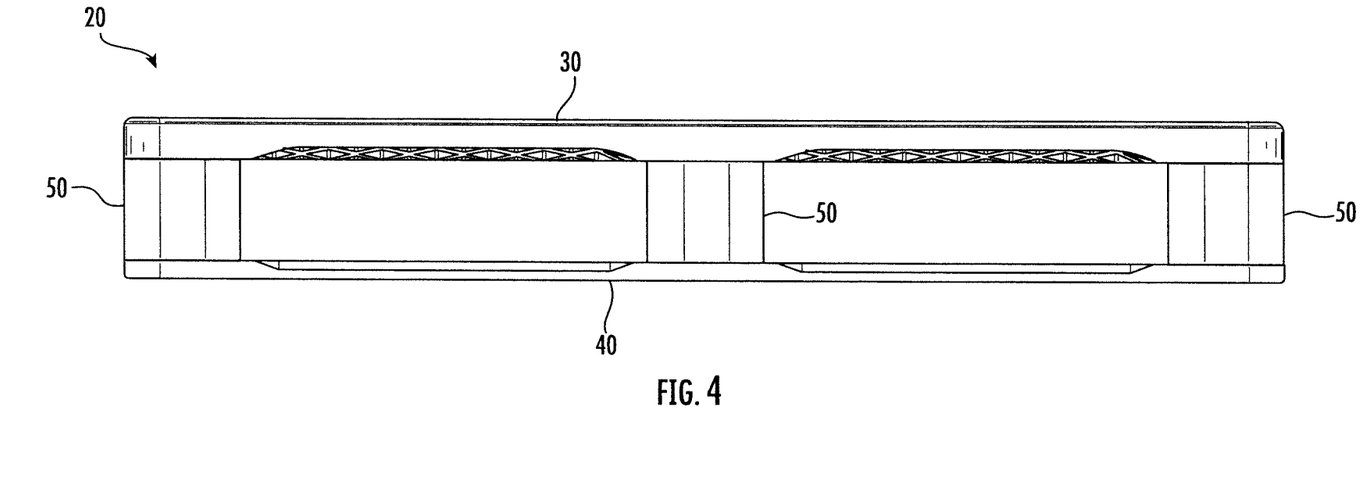
FIG. 4 is an exploded view of the hybrid pallet shown in FIG. 1.

The bottom deck 40 includes a pair of spaced apart end deck boards 42, and a pair of spaced apart connector boards 44 extending between the end deck boards 42. The bottom deck 40 also includes an intermediate connector board 46 extending between the end deck boards 42. The connector boards 44 and the intermediate connector board 46 are orthogonal to the end deck boards 42.

Each of the boards 42, 44, 46 in the bottom deck 40 include layered bamboo strips or slats that are cut from a bamboo stem. The bamboo boards 42, 44, 46 are formed by pressing together the layered bamboo strips. A plastic composite may be added to the layered bamboo strips, both of which are pressed together at high temperatures.

Figure 2A:
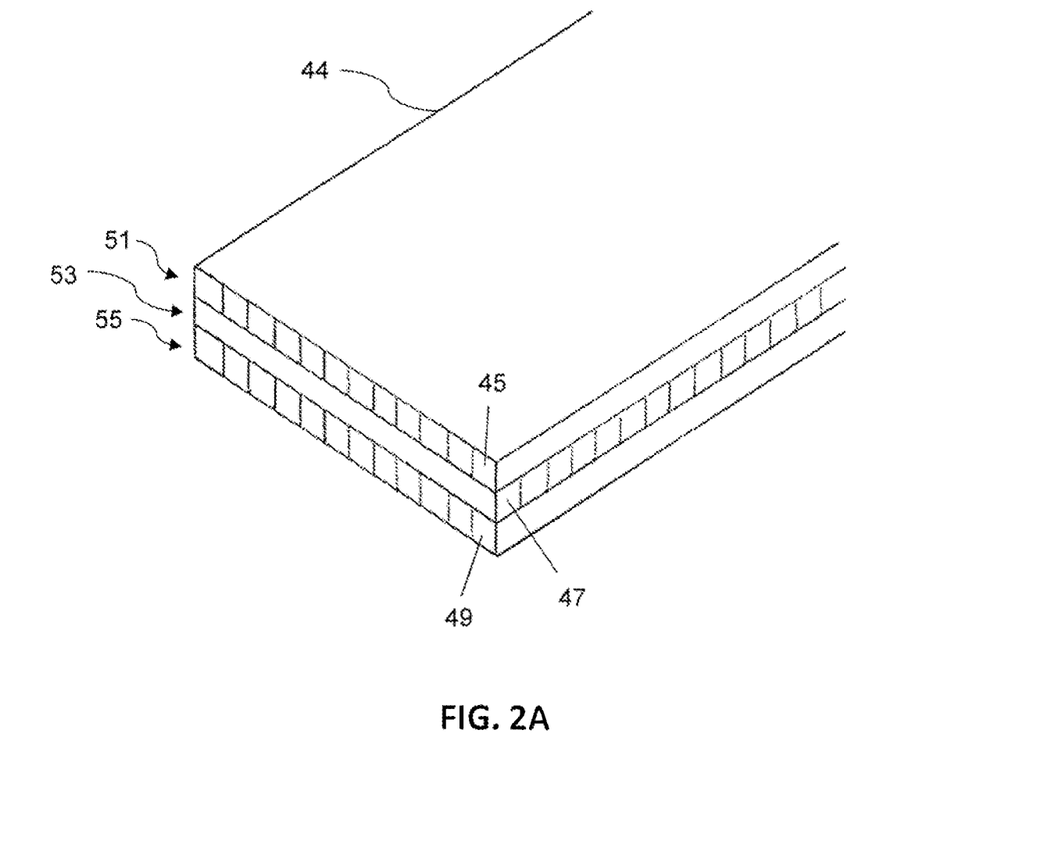
FIG. 2A is an end perspective view of one of the bamboo boards in the bottom deck of the hybrid pallet shown in FIG. 1.

To increase durability the bamboo boards 42, 44, 46 may be formed such that each bamboo strip is orthogonal to an adjacent bamboo strip when layered, as illustrated in FIG. 2A. In bamboo board 44, for example, bamboo strips 45, 47 are orthogonal to bamboo strips 49 positioned therebetween. Alternatively, the bamboo boards 42, 44, 46 may be formed as a ply of bamboo strips layered together in sections. Fox example, the bamboo boards 42, 44, 46 may each have top and bottom sections and at least one middle section, and a direction of the bamboo strips in the at least one middle section may be crisscrossed or orthogonal to a direction of the bamboo strips in the top and. bottom sections. Bamboo board 44, for example, includes top and bottom sections 51, 55 and a middle section 53 positioned therebetween.

The joints between the connector boards 44 and the end deck boards 42 may be standard or mitered. In a standard joint, the ends of each connector board 44 butt up against the sides of the end deck boards 42. Alternatively, the ends of the end deck boards 42 butt up against the sides of the each connector board 44. In a mitered joint, the ends of the connector boards 44 and the ends of the end deck boards 42 are joined at 45 degree angles. In addition, the joints between the connector boards 44 and the end deck boards 42 may be stepped (i.e., notched) to further increase durability of the bottom deck 40.

As noted above, the support blocks 50, 60 may be formed out of wood, plastic, wood/plastic composite, or metal. When formed out of a wood plastic composite material, each support block 50, 60 includes, for example, a mixture of wood filler, plastic and paper. An example composition is 20% wood filler, 60% plastic and 20% paper. This example composition is for illustration purposes, and is not to be limiting.

A wood, plastic or wood/plastic composite support block 50, 60 would all generally have a rectangular shape. When the support blocks 50, 60 are formed out of metal, each support block would generally be C-shaped or U-shaped.

The support blocks 50 are in contact with both the end deck boards 42 and either one of the connector boards 44 or the intermediate connector board 46, whereas the support blocks 60 are only in contact with one of the connector boards 44 or the intermediate connector board 46. Support blocks 50 are larger in size as compared to support blocks 60. In other embodiments, the support blocks 50, 60 may be equal in size.

Figure 6:
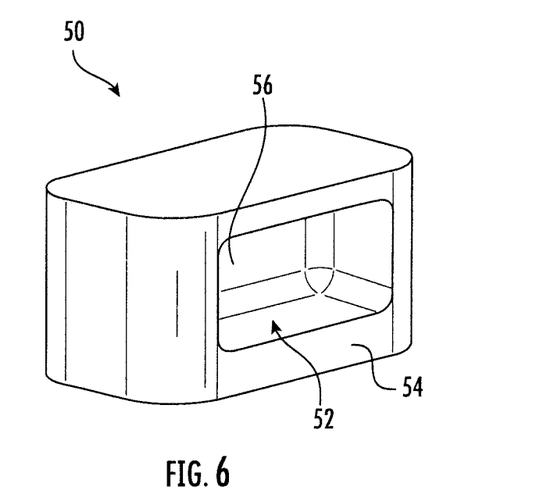
FIG. 6 is an upper perspective view of one of the larger sized support blocks shown in FIG. 1.

Each illustrated support block 50 includes a pocket or scoop 52 that partially extends from one of the sides 54 of the support block 50 towards an opposing side 56. More particularly, the support block 50 includes an upper surface, a lower surface, and first and second pairs of opposing sides extending between the upper and lower surfaces. The pocket 52 is formed in one of the sides 54. The pocket 52 does not extend all the way through to the opposing side 56. The pocket 52 does not compromise durability. Corners of each support block 50 may be curved or beveled.

The side 54 with the pocket 52 formed therein includes an outer exposed wall that surround the pocket 52. The pocket 52 includes a bottom surface and adjacent side surfaces, with the adjacent side surfaces being non-orthogonal or angled with respect to the outer exposed wall and the bottom surface. Alternatively, the adjacent side surfaces within the pocket 52 may be orthogonal or perpendicular with respect to the outer exposed wall and the bottom surface.

An advantage of the support blocks 50 with a pocket 52 formed therein is that each pocket 52 facilities rotation of the hybrid pallet 20 by a forklift operator. Rotation of a pallet is known as pin wheeling. To pin wheel the hybrid pallet 20, the operator of the forklift uses one of the sharp metal tines of the forklift to contact a pocket 52 of one of the support blocks 50. The pocket 52 allows the tine to grip the hybrid pallet 20 for it to be spun 90 degrees.

Figure 7:
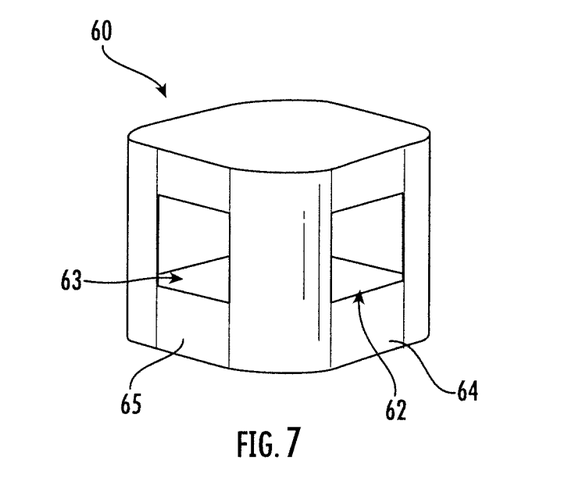
FIG. 7 is an upper perspective view of one of the smaller sized support blocks shown in FIG. 1.

The support blocks 60 include openings 62 without compromising durability. In contrast to the pockets 52, a first opening 62 extends all the way through opposing side walls 64, and a second opening 63 extends all the way through opposing side walls 65. More particularly, the support block 60 includes an upper surface, a lower surface, a first pair of opposing sides 64 extending between the upper and lower surfaces and having a first opening 62 extending therethrough, and a second pair of opposing sides 65 extending between the upper and lower surfaces and having a second opening 63 extending therethrough and intersecting with the first opening 62. Corners of each support block 60 may be curved or beveled.

Screws may be used to secure the top deck 30 to the illustrated support blocks 50, 60. Nails may be used to secure the bottom deck 40 to the illustrated support blocks 50, 60. If the support blocks 50, 60 were made out of metal, then screws would be used to secure the bottom deck 40 to the metal support blocks.

When the support blocks 50, 60 are formed from wood, plastic or a wood plastic composite material, the pockets 52 in the support blocks 50 and the openings 62, 63 in the support blocks 60 allow clinch nails to be used. The nail gun is positioned such that a portion of the nail gun is below the bottom deck 40 and a portion of the nail gun is within a pocket 52 or openings 62, 63 such that as the clinch nail is driven into the bottom deck 40 a tip of the clinch nail is exposed within the pocket 52 or openings 62, 63, with the exposed tip then being bent over into the support block 50, 60.

In alternate embodiments, the hybrid pallet 20 may be configured such that the top deck 30 is formed out of bamboo, and the bottom deck 40 is formed out of plastic. The support blocks 50, 60 are not limited to any particular material.

Figure 8:
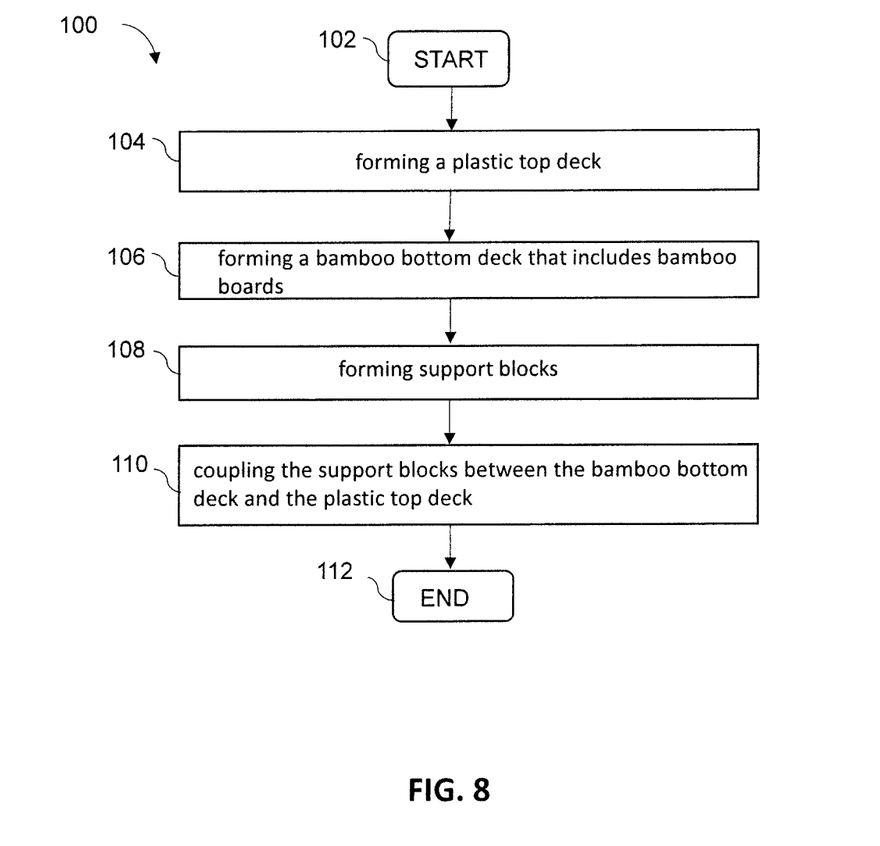
FIG. 8 is a flowchart of a method for making the hybrid pallet illustrated in FIG. 1.

Referring now to FIG. 8, a flowchart 100 illustrating a method for making the hybrid pallet 20 will be discussed. From the start (Block 102), the method includes forming a plastic top deck 30 at Block 104, and forming a bamboo bottom deck 40 that includes a plurality of bamboo boards 42, 44, 46 at Block 106. A plurality of support blocks 50, 60 is formed at Block 108. The method further includes coupling the plurality of support blocks 50, 60 between the bamboo bottom deck 40 and the plastic top deck 30 at Block 110. A gap is formed between the bamboo bottom deck 40 and the plastic top deck 30 for receiving a lifting member. The method ends at Block 112.

The vast majority of pallets are primarily constructed of materials such as wood and plastic. Wood pallets are advantageous in terms of cost, but can be relatively heavy in weight. Plastic pallets can easily be molded and are more durable and lighter weight than wooden pallets. However, a disadvantage of plastic pallets is that they are more expensive than wooden pallets. The hybrid pallet 20 as discussed above addresses these concerns.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed:

1. A pallet comprising:
   a top deck support;
   a bamboo bottom deck comprising a plurality of bamboo boards; and
   a plurality of support blocks coupled between said bamboo bottom deck and said top deck, with a gap being formed therebetween for receiving a lifting member, with at least one of said support blocks comprising:
   an upper surface,
   a lower surface, and
   a pair of opposing sides extending between the upper and lower surfaces, with one of the sides having a pocket formed therein for receiving an end of the lifting member so as to allow the pallet to be spun around,
   the pocket does not extend all the way to the other opposing side, and the side with the pocket formed therein includes an outer exposed wall that surrounds the pocket, and the pocket includes a bottom surface, side surfaces and a back surface, wherein an interface between the bottom surface and the back surface is non-orthogonal or angled with respect to the outer exposed wall.

2. The pallet according to claim 1 wherein each bamboo board comprises a plurality of bamboo strips layered together.

3. The pallet according to claim 2 wherein each bamboo board further comprises a plastic composite added to the plurality of bamboo strips.

4. The pallet according to claim 2 wherein a direction of each bamboo strip is orthogonal to a direction of an adjacent bamboo strip.

5. The pallet according to claim 1 wherein each bamboo board comprises:
   a top section comprising a plurality of bamboo strips layered together, with the plurality of bamboo strips extending in a first direction;
   a bottom section comprising a plurality of bamboo strips layered together, with the plurality of bamboo strips extending in the first direction; and
   at least one middle section between said top and bottom sections, with said at least one middle section comprising a plurality of bamboo strips layered together, with the plurality of bamboo strips extending in a second direction that is different from the first direction.

6. The pallet according to claim 5 wherein the second direction is at least one of orthogonal and crisscrossed with respect to the first direction.

7. The pallet according to claim 1 wherein said bamboo bottom deck comprises:
   a pair of bamboo end deck boards;
   a pair of bamboo connector boards extending between said pair of bamboo end deck boards; and
   an intermediate bamboo connector board extending between said pair of bamboo end deck boards, with said intermediate bamboo connector board and said bamboo connector boards being orthogonal to said bamboo end deck boards.

8. The pallet according to claim 7 wherein respective joints between said pair of bamboo end deck boards and said pair of bamboo connector boards are mitered.

9. The pallet according to claim 1 further comprising at least one clinched nail extending through one of said bamboo boards and into the pocket in said at least one support block.

10. The pallet according to claim 1 wherein at least one of said support blocks comprises:
    an upper surface;
    a lower surface;
    a first pair of opposing sides extending between the upper and lower surfaces and having a first opening extending therethrough; and
    a second pair of opposing sides extending between the upper and lower surfaces and not having a second opening extending therethrough to intersect with the first opening.

11. The pallet according to claim 10 further comprising at least one clinched nail extending through one of said bamboo boards and into the first or second opening in said at least one support block.

12. The pallet according to claim 1 wherein each support block comprises at least one of wood, plastic, wood and plastic composite, and metal.

13. The pallet according to claim 1 wherein said top deck is configured as a monolithic plastic top deck comprising a plurality of metal strips inserted therein for support.

14. The pallet according to claim 13 wherein each metal strip includes perforated holes extending therethrough, and with the perforated holes extending in a direction that is orthogonal to an upper surface of said plastic top deck.

15. A method for making a pallet comprising:
    forming a support;
    forming a bamboo bottom deck comprising a plurality of bamboo boards;
    forming a plurality of support blocks; and
    coupling the plurality of support blocks between the bamboo bottom deck and the top deck, with a gap being formed therebetween for receiving a lifting member, with at least one of the support blocks comprising:
    an upper surface,
    a lower surface, and
    a pair of opposing sides extending between the upper and lower surfaces, with one of the sides having a pocket formed therein for receiving an end of the lifting member so as to allow the pallet to be spun around, the pocket does not extend all the way to the other opposing side, and the side with the pocket formed therein includes an outer exposed wall that surrounds the pocket, and the pocket includes a bottom surface, side surfaces and a back surface, wherein an interface between the bottom surface and the back surface is non-orthogonal or angled with respect to the outer exposed wall.

16. The method according to claim 15 wherein each bamboo board comprises a plurality of bamboo strips layered together.

17. The method according to claim 15 wherein each bamboo board comprises:
a top section comprising a plurality of bamboo strips layered together, with the plurality of bamboo strips extending in a first direction;
a bottom section comprising a plurality of bamboo strips layered together, with the plurality of bamboo strips extending in the first direction; and
at least one middle section between the top and bottom sections, with the at least one middle section comprising a plurality of bamboo strips layered together, with the plurality of bamboo strips extending in a second direction that is different from the first direction.

18. The method according to claim 15 wherein forming the bamboo bottom deck comprises:
forming a pair of bamboo end deck boards;
forming a pair of bamboo connector boards extending between the pair of bamboo end deck boards; and
forming an intermediate bamboo connector board extending between the pair of bamboo end deck boards, with the intermediate bamboo connector board and the bamboo connector boards being orthogonal to said bamboo end deck boards.

19. The method according to claim 18 wherein respective joints between the pair of bamboo end deck boards and the pair of bamboo connector boards are mitered.

20. The method according to claim 15 wherein the top deck is configured as a monolithic plastic top deck comprising a plurality of metal strips inserted therein for support.

* * * * *